United States Patent Office 2,973,251
Patented Feb. 28, 1961

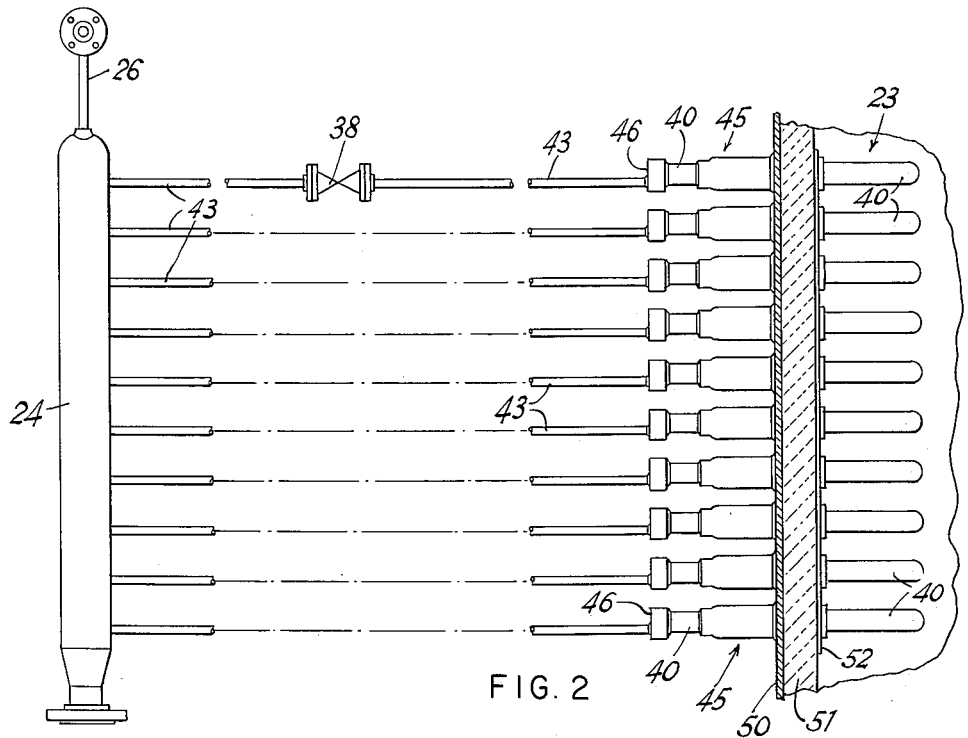
FIG. 2
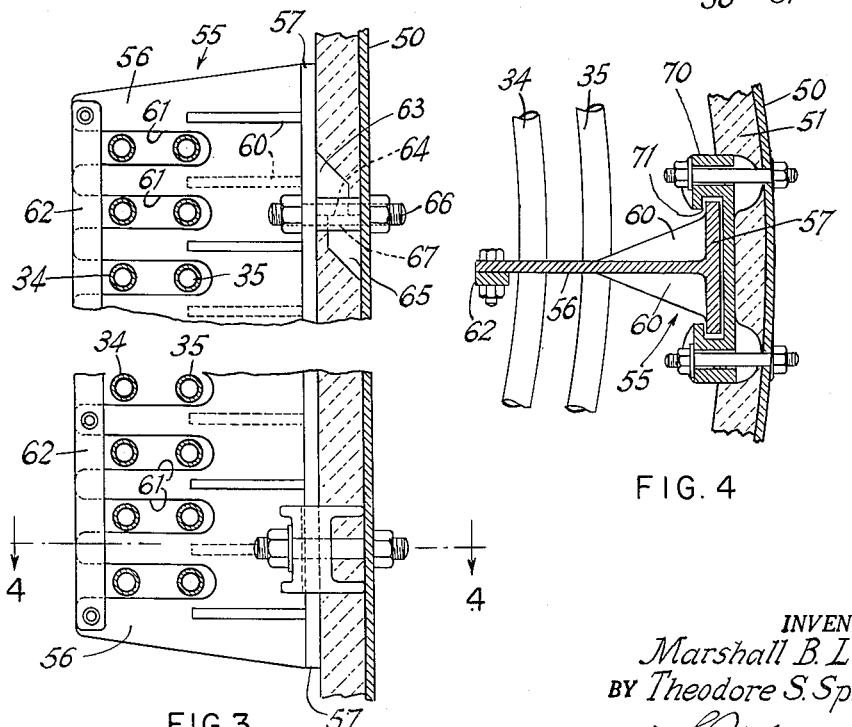
FIG. 3
FIG. 4
INVENTORS
Marshall B. Leland
BY Theodore S. Sprague
*J.P.Moran*
ATTORNEY

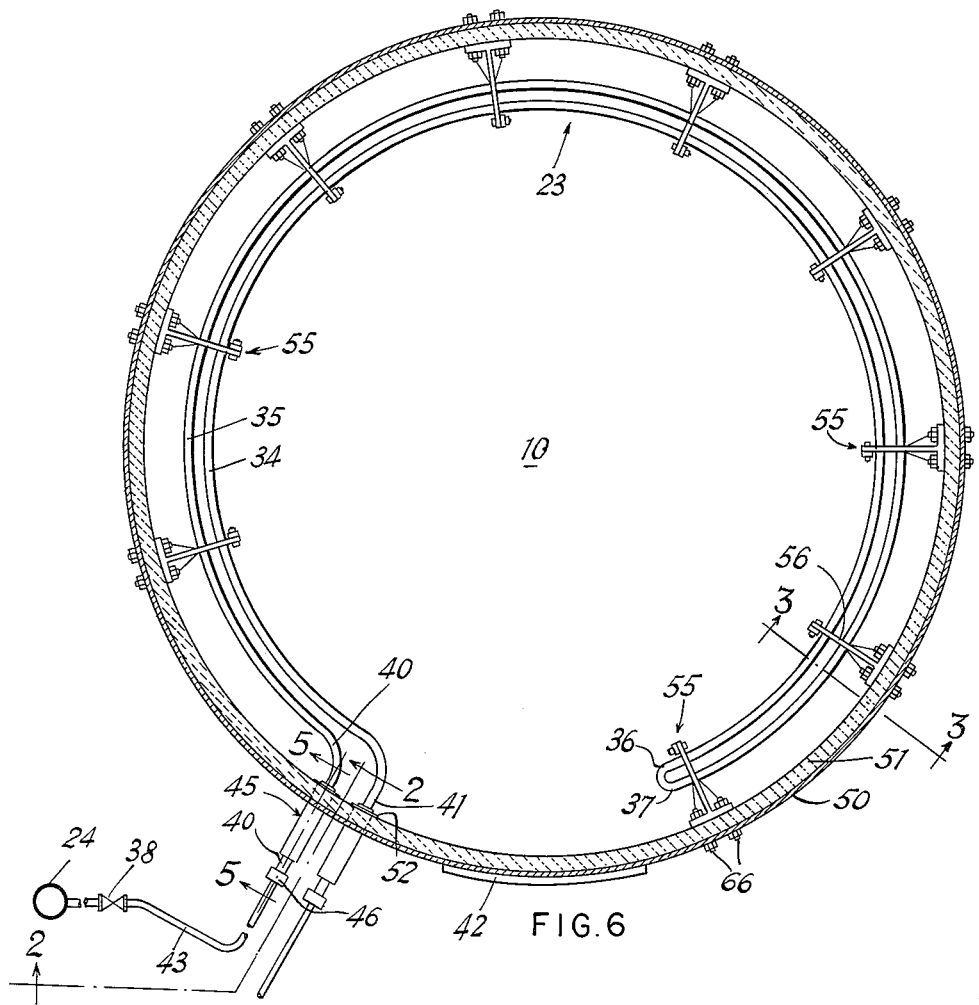
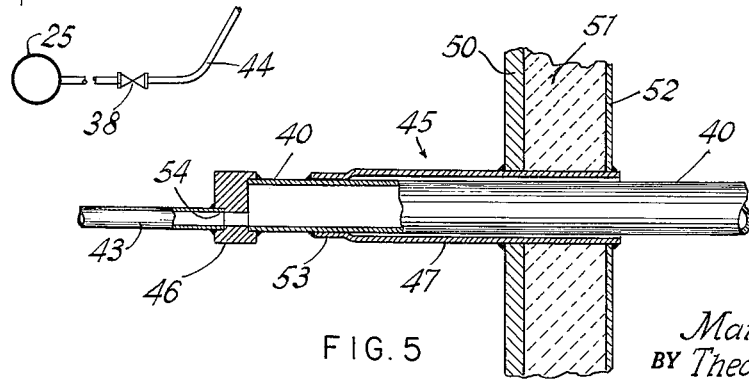
FIG. 6
FIG. 5
INVENTORS
Marshall B. Leland
BY Theodore S. Sprague
ATTORNEY

2,973,251

HEAT TRANSFER APPARATUS

Theodore S. Sprague, Hewlett, N.Y., and Marshall B. Leland, Canton, Ohio, assignors to The Babcock & Wilcox Company, New York, N.Y., a corporation of New Jersey Filed Apr. 29, 1952, Ser. No. 284,892

7 Claims. (Cl. 23—284)

The present invention relates to heat exchange apparatus, and more particularly to heat exchange surfaces installed in and controlling the temperature of exothermic or endothermic reactions occurring in a fluidized bed of finely divided solid materials.

In the present invention a plurality of heat exchange elements are positioned in a confined bed of fluent solid material to control the temperature of the bed in accordance with indications of the bed temperature. While the invention is not limited thereto, the construction and arrangement of heat exchange elements is particularly applicable to the temperature regulation of a fluidized bed of particle-form solid materials.

The heat exchange surfaces of the elements are submerged in the fluidized bed with the flow of the heat exchange medium passing through the elements regulated for bed temperature control. Advantageously the heat exchange surfaces are positioned adjacent to and supported from the wall of the vessel confining the fluidized bed, and are spaced to facilitate accessibility to the interior of the vessel through an access door in the wall of the vessel. Under operating conditions of extreme temperature differences, a heat storage device is installed in the inlet end portion of the heat exchange element to reduce the heat shock to the metallic walls of the tubular elements when relatively cold vaporizable liquid heat exchange medium is initially introduced into the heated elements.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which preferred embodiments of the invention have been illustrated and described.

Of the drawings:

Fig. 2 is an enlarged elevation view of a portion of the apparatus shown in Fig. 1 and taken on line 2—2 of Fig. 6;

Fig. 3 is an enlarged view of a cooling element support taken on the line 3—3 of Fig. 6;

Fig. 4 is a plan section view taken on the line 4—4 of Fig. 3;

Fig. 5 is an enlarged section taken on line 5—5 of Fig. 6;

Fig. 6 is an enlarged section taken on line 6—6 of Fig. 1; and

Fig. 7 is a section plan view of a heat storage device usable in the inlet portion of the tubular cooling element shown in Fig. 6.

Figure 1:
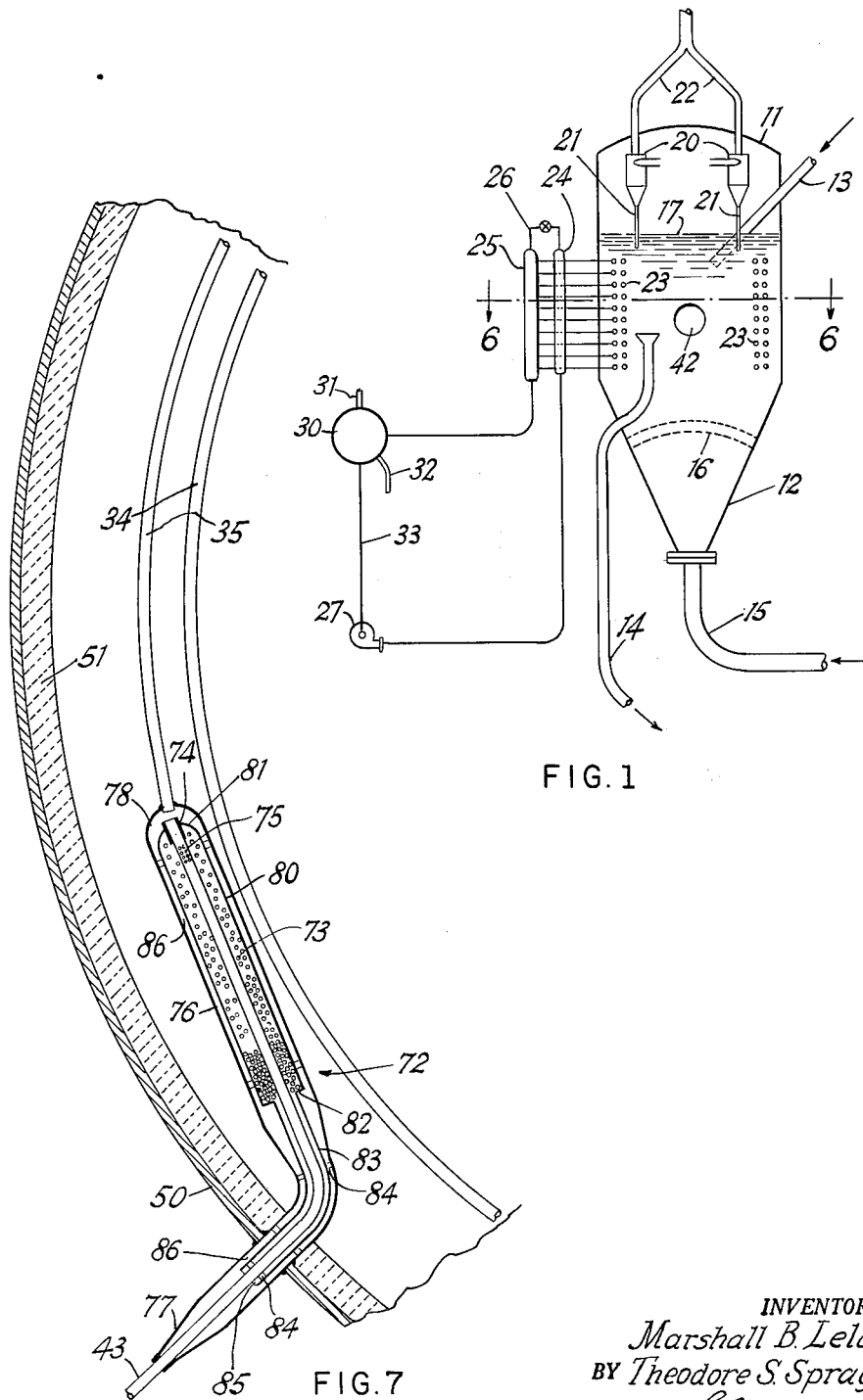
Fig. 1 is a schematic elevation view of a catalyst regenerator incorporating the present invention.

The present invention is illustrated in the drawings as applied to apparatus for the regeneration of fluidized catalytic materials. However, the invention is not limited to heat exchange in a fluidized bed but can be used successfully for either exothermic or endothermic reactions involving the use of a moving bed of solid heat transfer materials. It will also be apparent that heat transfer mediums other than water may be used, if desired, in the apparatus of the present invention.

As shown in Fig. 1, a chamber or vessel 10 of cylindrical section having a domed top 11 and an inverted conical bottom 12 is arranged for the regeneration of fluidized catalyst. The contaminated catalyst is introduced into the chamber through an inlet duct 13 with the regenerated catalyst discharged through an outlet pipe 14. A fluidizing and regenerating gaseous fluid, such as air, is introduced into the lower portion of the vessel 10 through a pipe 15 and passes upwardly through a grid 16 to fluidize the particle form material in the vessel. As indicated in Fig. 1, a more or less distinct upper surface 17 of the fluidized bed is maintained in the upper portion of the vessel. Above the surface of the fluidized bed, or as it is sometimes termed above the dense phase of the fluidized solid material, the customary cyclonic type separators 20 are installed to separate the catalyst from the gaseous fluid leaving the fluidized bed. The separators have a lower catalytic material discharge spout 21 projecting beneath the surface 17 of the fluidized bed, and an upper gaseous fluid discharge duct 22, which extends through the top 11 of the vessel for discharge to atmosphere, or when required, through heat recovery apparatus and/or additional dust collecting devices prior to atmospheric discharge.

The heat exchange surfaces of the present invention are indicated in Fig. 1, and comprise a plurality of separate heat exchange elements 23 arranged in horizontal planes submerged in the fluidized bed of the catalyst. As hereinafter described, the inlet and outlet ends of the heat exchange elements project through the wall of the vessel at closely spaced positions and are connected with upright inlet and outlet headers, 24 and 25, respectively. The headers are connected by a by-pass pipe 26. The inlet header receives water from a pump 27 and discharges the water in controllable amounts to each of the heat exchange elements 23, as hereinafter described. The outlet header 25 receives a mixture of steam and water, or steam, from the elements 23 and is connected directly to a steam and water drum 30, which is provided with well-known steam separating devices whereby substantially dry steam is discharged through a conduit 31 for power generation or process use. The drum is provided with a source of makeup water through a feed water connection 32. A pipe 33 opening from the lower portion of the steam and water drum connects the water storage space of the drum 30 with the inlet of the pump 27.

As shown particularly in Fig. 6, the heat exchange elements 23 of the present invention include a pair of tubular members 34 and 35, each having circular configuration similar to the wall of the vessel 10. In the present instance, with a cylindrical vessel, the tubular members 34 and 35 are also curved and lie in a horizontal plane with adjacent ends 36 and 37, respectively, thereof joined for fluid flow therebetween while the opposite ends 40 and 41 of the members are extended through the wall of the vessel for connection with the inlet and outlet headers 24 and 25. The joined ends of the members forming each element are horizontally spaced from the header connections of the elements, so that a segment of the vessel corresponding with a covered access opening 42 in the wall thereof is unobstructed by tubular members. This arrangement of the elements advantageously provides ready access to the interior of the vessel when periodic inspection or maintenance of, for example the grid 16 or the separators 20, is necessary.

As shown in Fig. 6, the heat transfer elements are radially spaced from the wall of the vessel so that the effect of heat transfer medium flow through the elements is concentrated in the general vicinity of the chamber walls. It will be appreciated that this arrangement of the cooling elements is applicable to a fluidized bed type of reaction since such fluidized beds are characteristically capable of maintaining substantially uniform temperatures throughout.

As shown in Figs. 1, 2 and 6, the illustrated embodiment of the invention includes ten separate heat exchange elements 23 individually controlled as by valves 38, insofar as fluid flow through each is concerned. The inlet and outlet extensions 40 and 41, respectively, of each of the elements extending through the wall of the vessel 10 are provided with thermal sleeves thereby permitting the formation of a fluid tight joint or seal between the tubular extensions and the wall of the vessel, while making the fluid tube 40 out of direct contact with the shell. In accordance with good practice, each of the individual water connections 43 from the header 24 to the inlet pair of shut-off valves and a drain connection positioned therebetween (not shown). A similar valve and drain combination (not shown) is also provided in the pipe connection 44 leading from the extension 41 to the outlet header 25.

When using a steam and water flow circuit for heat exchange purposes, as illustrated in the drawings, the cross-sectional area of the pipe 43 connecting the inlet header 24 with the extension 40 in the inlet end of an element 23 will be reduced in comparison with the cross-sectional area of the connection 44 leading to the outlet header 25. The thermal sleeve 45 and orifice plate 46 connecting the pipe connection 43 and the inlet extension 40 of the tubular member 35 is shown in Fig. 5. The thermal sleeve 45 consists of a length of tube 47 having an internal diameter greater than the external diameter of the extension 40 of the tubular member projecting through the wall of the vessel 10. The wall of the vessel 10 is formed of a metallic plate 50 having an internal lining of ceramic refractory material 51, and in the area of the tubular extensions 40 and 41 with an inner metallic plate 52 which is curved to follow the contour of the plate 50 and abut the refractory material 51. Internally of the wall the tube 47 is circumferentially welded to the plate 52, exteriorly welded to the plate 50 and projects outwardly to a reduced diameter portion 53 which is welded to the extension 40 of the tubular member. Exteriorly spaced from the reduced diameter portion 53 of the tube 47 is an orifice plate 46 which is provided with a recess 54 to accommodate the inlet pipe connection 43 which is welded therein. A similar thermal sleeve is utilized for the tubular member outlet extension 41, where the pipe connection 44 between the extension 41 and the outlet header 25 is of the same cross-sectional flow area as that of the member 34. The construction described provides a fluid tight joint in the wall of the vessel 10 adjoining the inlet and outlet extensions of the heat exchange elements 23.

One particular advantage of positioning the heat transfer elements adjacent the wall of the chamber lies in the adaptability to an adequate yet economic support means for the heat transfer elements. As shown in Figs. 3, 4 and 6, the heat exchange elements 23 are supported at circumferentially spaced positions by brackets 55. Each bracket is made up of a plate 56 having a flange 57 at one end thereof, forming a T-shaped member in horizontal cross-section and having a series of stiffening webs 60 alternately spaced along the opposite sides of the plate between the plate 56 and flange 57. The plate 56 is slotted with each slot 61 opening radially toward the center of the vessel 10. Each slot is of sufficient height to receive an element 23 and has sufficient radial length to accommodate the members 34 and 35 forming each element. A retaining bar 62 is bolted in an upright position to the inner end of the plate 56 to lock the elements 23 loosely within the slots 61 of the plate.

The brackets 55 are supported from the wall of the vessel 10. As shown in Fig. 3, the upper portion of the flange 57 is provided with a lug 63 which projects outwardly of the flange. The lug has a lower surface 64 which is normal to the outer surface of the flange, and engages an oppositely arranged lug 65 attached to the shell plate 50 of the vessel. The facing engagement of the lugs 63 and 65 is maintained by a pair of bolts 66 positioned on opposite sides of the lugs, and retained in radial position by spacers 67.

With the brackets 55 maintained in vertical position relative to the wall plate 50 by the lugs 63 and 65, the lower portion of each bracket is supported against any substantial radial motion while permitting vertical motion relative to the wall plate 50 of the vessel by the guide member 70. The guide member is bolted to the plate 50 and is provided with a vertical recess 71 in which the flange 57 is free to expand or contract from its fixed upper end in a vertical direction. With the support described, the members 34 and 35 are guided in their movement relative to the brackets 55 in both a radial direction, as limited by the depth of the slots 61 inwardly of the bar 62, and in a horizontal direction axially of the members as limited by the fixed attachment of the members to the plate 50 of the vessel through the thermal sleeves 45.

When the described apparatus is used to control the temperature of the fluidized bed in a catalytic regenerator vessel, a cooling medium, such as water, is delivered to the inlet header 24 and distributed to the heat transfer elements 23. The absorption of heat from the fluidized bed vaporizes water, and the steam, or steam and water mixture, is delivered to the outlet header 25 and passed to the drum 30. The by-pass pipe 26 is provided with an orifice restrictor plate so that sufficient water flows from the inlet header through the discharge header and connecting piping to the drum 30 to insure temperatures substantially equal to water saturation temperatures at the operating pressure and to thereby protect the drum and the connecting piping. Under these conditions, the temperature changes in the metal walls of the fluid flow circuit are not ordinarily excessive and are not damaging thereto.

Changes in the operating conditions of the fluidized bed tending to increase or decrease the temperature thereof will necessitate the stoppage of fluid flow through one or more of the elements 23, or the reintroduction of flow through certain elements to maintain the bed at a desired temperature. Under such circumstances, some of the elements are alternately subjected to periods of cooling fluid flow and an absence of cooling fluid flow, and the operational life of the members is reduced due to heat shock. Such operating conditions may occur during starting up periods of the generator.

The effects of heat shock can be minimized by the use of means for heating the fluid before it directly contacts the relatively hotter heat transfer surfaces of the tubular elements. For example, if the fluidized bed has attained a temperature of the order of 1000° F.–1100° F. before the introduction of cooling fluid into the elements 23 and a need for catalyst bed cooling arises, the passage of cooling water into the inlet of the elements causes severe heat shock to the metal walls of the elements, particularly adjacent the inlet ends thereof. Such heat shock can be minimized by heating the cooling medium, as for example, by the use of superheated steam delivered to the inlet header 24. However, this procedure necessitates the provision of a source of superheated steam or other heated cooling fluid which may not be either convenient, considering the temperature control of the heated fluid, or economical. We have found the adverse effects of heat shock on the elements 23 can be largely avoided by the use of heat storage means positioned within the fluidized bed and incorporated in the cooling fluid flow circuit of the elements 23. One desirable form of heat storage means is illustrated in Fig. 7.

As shown, the heat storage means 72 includes a plurality of nested tubes confining a mass of heat storage bodies 73, such as metallic balls, with the tubes arranged to direct a flow of the entering cooling fluid through a circuitous path including contact with the bodies 73 so that the fluid is heated, and when a vaporizable liquid is used, such as water, at least some of the liquid is vaporized by the stored heat and the temperature difference between the fluid and the tube walls is reduced. With the heat storage means positioned within the vessel, and under conditions of no fluid flow therethrough, the heat storage bodies 73 acquire a temperature substantially equal to the prevailing temperature of the fluidized bed. The heat storage means is constructed with one portion thereof substituted for the thermal sleeve 45 and orifice plate 46 shown in Figs. 5 and 6, the tube extension 40, and connects the pipe 43 with the member 35.

Referring to Fig. 7, the pipe 43 is extended through the wall of the vessel 10 and bent to project in a straight line to a position spaced from the end of the member 35. The end of the pipe 43 is closed by a cap 74, and provided with a plurality of ports 75 in the end portion thereof. A tubular housing 76 encloses the pipe 43 between a reduced cross-section outer end portion 77 welded to the pipe 43 exteriorly of the plate 50 and a hemispherical end portion 78 which is welded to the exterior surface of the end of member 35. The housing 76 is coaxial with the extension of the pipe 43 and is welded to the plate 50 of the vessel so as to provide a seal against leakage through the wall of the vessel 10.

The portion of the housing 76 positioned within the vessel 10 is of greater diameter than the housing portion extending through the vessel wall, and encloses a cylindrical member 80 having a hemispherical end 81 secured in fluid tight relation to the cap 74 at the end of the pipe 43. The bodies 73 disposed between the walls of the member 80 and pipe 43 are retained within the cylindrical member by an annular plate 82 which is welded around its exterior circumference to the member 80 and around its interior circumference to a tubular element 83. The element 83 is coaxial with both the pipe 43 and the adjacent portion of the housing 76, and has a diameter intermediate that of the pipe and the housing. The axial relationship between the parts described is maintained by a series of spacers, such as indicated at 84.

With the device described, an initial flow of incoming cooling fluid passes through the pipe 43 and through the ports 75 in the end portion thereof. In passing through the cylindrical member 80 the cooling fluid is heated by heat stored in the bodies 73 and passes through an annular passageway 85 between the exterior surface of the pipe 43 and the interior surface of the element 83. Thereafter the heated cooling fluid passes around the open end of the element 83 and through the passageway 86 exteriorly defined by the housing 76 and thence into the tubular member.

It will be appreciated the use of a heat storage device is applicable in many types of heat transfer service and is not limited to the illustrated embodiment of the invention.

While in accordance with the provisions of the statutes we have illustrated and described herein the best form of the invention, and its mode of construction now known to us, those skilled in the art will understand that changes may be made in the form of the apparatus disclosed without departing from the spirit of the invention covered by the claims, and that certain features of the invention may sometimes be used to advantage without a corresponding use of the other features.

We claim:

1. A closed vessel of circular cross-section, means for maintaining a fluidized bed of particle-form solid material within said vessel, means for regulating the temperature of said fluidized bed by indirect heat exchange with a heat exchange medium comprising pairs of reverse bend connected heat exchange tubular members annularly disposed in a substantially horizontal plane within said vessel, and bracket means for slidably supporting said tubular members from the wall of said vessel for movement in the direction of the longitudinal axes of said tubular members.

2. A closed vessel, means for maintaining a fluidized bed of particle-form solid material within said vessel, means for regulating the temperature of said fluidized bed by indirect heat exchange with a heat exchange medium comprising heat exchange tubular members disposed in substantially horizontal planes and submerged within said fluidized bed, and heat storage means inside said tubular members within said vessel connected in the heat exchange medium flow path to said tubular members.

3. A closed vessel, means for maintaining a gas-pervious mass of fluent solid material moving through said vessel, a plurality of horizontally disposed heat exchange elements submerged in the mass of solid material and vertically spaced within said vessel, each of said elements comprising a pair of tubular members having axial configurations similar to and spaced from the internal wall of said vessel, adjacent ends of said tubular members joined by a reverse bend and the opposite adjacent ends of said members shaped to project through the wall of said vessel at a position horizontally spaced from the reverse bend joined ends thereof, and means for slidably supporting said elements from the wall of said vessel.

4. A closed vessel, means for maintaining a gas-pervious mass of fluent solid material moving through said vessel, a plurality of horizontally disposed heat exchange elements submerged in the mass of solid material and vertically spaced within said vessel, each of said elements comprising a pair of tubular members having axial configurations similar to and spaced from the internal wall of said vessel, adjacent ends of said tubular members joined by a reverse bend and the opposite adjacent ends of said members shaped to project through and attached to the wall of said vessel at a position horizontally spaced from the reverse bend joined ends thereof, means for supporting said elements from the wall of said vessel for movement in the direction of the longitudinal axes of said tubular members, and means for regulating the temperature of said mass of solid material within said vessel by passing a heat exchange medium selectively through each of said elements.

5. A closed vessel, means for maintaining a gas pervious mass of fluent solid material moving through said vessel, means causing an exothermic reaction within said mass of fluent solid material, a plurality of horizontally disposed heat exchange elements submerged in the mass of solid material within said vessel, each of said elements comprising side by side horizontally spaced tubular members connected at an end thereof by a reverse bend and having axial configurations similar to and adjacent the wall of said vessel, adjacent ends of said members shaped to project through the wall of said vessel at a position horizontally spaced from the reverse bend connected ends thereof, means for supporting said elements from the wall of said vessel for movement in the direction of the longitudinal axes of said tubular members, and means for controlling the temperature of said mass of fluent heat transfer material including means for delivering a controlled flow of vaporizable liquid to each of said elements and receiving the vapor generated within said elements.

6. In combination with a catalyst regenerating vessel, means for maintaining a fluidized bed of said catalyst within said vessel, and means for cooling said catalyst during the regeneration thereof comprising a plurality of vertically spaced horizontally disposed heat exchange elements submerged in the fluidized catalyst within said vessel, each of said elements comprising spaced tubes having an axial configuration similar to and spaced from the wall of said vessel, adjacent ends of said tubes connected in fluid flow relationship and the opposite adjacent ends of said tubes arranged to project through the wall of said vessel at a position horizontally spaced from the connected ends thereof, means for cooling said catalyst by the absorption of heat from said fluidized bed including the controlled delivery of a vaporizable liquid medium to the inlet ends of said elements and the withdrawal of vaporized medium from the outlet ends of said elements, and means within the inlet end of said elements and within said vessel to preheat the entering medium.

7. In a fluid catalyst regenerator of a hydrocarbon cracking unit, the combination of a vertically positioned regenerator chamber, an internal tubular catalyst cooling coil in the form of a reverse flow interrupted annulus which proceeds substantially around the inside of the regenerator chamber in a substantially horizontal plane and which reverses itself to proceed in reverse direction from the inlet coil section back around the inside of the regenerator chamber in substantially the horizontal plane of and parallel to the inlet coil section, an inlet connection from outside the regenerator chamber to the inlet coil section, a second connection adjacent to said inlet connection from outside the regenerator chamber to the outlet coil section, said coil being fixed to said regenerator chamber solely at said adjacent inlet and outlet coil connections, and a plurality of support means circumferentially mounted around said regenerator chamber in slidable supporting contact with said cooling coil thereby permitting free horizontal movement of said coil.

References Cited in the file of this patent
UNITED STATES PATENTS

| | | |
|---|---|---|
| 1,382,670 | Price | June 28, 1921 |
| 2,341,193 | Scheineman | Feb. 8, 1944 |
| 2,433,798 | Voorhees | Dec. 30, 1947 |
| 2,462,861 | Gunness | Mar. 1, 1949 |
| 2,494,337 | Hemminger | Jan. 10, 1950 |
| 2,560,356 | Liedholm | July 10, 1951 |
| 2,565,513 | Morrison | Aug. 28, 1951 |
| 2,584,391 | Leffer | Feb. 5, 1952 |